(12) United States Patent
Pedrini

(10) Patent No.: US 6,761,297 B1
(45) Date of Patent: Jul. 13, 2004

(54) RIDE READY VEHICLE-MOUNTED BICYCLE CARRIER

(76) Inventor: Fabio Pedrini, Via Zamboni 1/Scala-A, Piano-1, Interno-3, CAP 40125 Bologna (IT)

( * ) Notice: Subject to any disclaimer, the term of this patent is extended or adjusted under 35 U.S.C. 154(b) by 0 days.

(21) Appl. No.: 10/156,378

(22) Filed: May 28, 2002

Related U.S. Application Data

(60) Provisional application No. 60/314,428, filed on Aug. 23, 2001.

(51) Int. Cl.[7] .................................................. B60R 9/00
(52) U.S. Cl. ..................... 224/519; 224/324; 224/325; 224/536; 224/537; 224/570; 224/571; 224/924
(58) Field of Search ................................ 224/317, 324, 224/325, 519, 533, 536, 537, 567, 570, 571, 924; 280/762, 769; 414/462

(56) References Cited

U.S. PATENT DOCUMENTS

| | | |
|---|---|---|
| 488,395 A | 12/1892 | Justice |
| 529,827 A | 11/1894 | Fonda |
| 556,789 A | 3/1896 | Walker |
| 576,351 A | 2/1897 | Penfield |
| 586,681 A | 7/1897 | Douglas |
| 607,024 A | 7/1898 | Durfee et al. |
| 615,264 A | 12/1898 | Du Pont |
| 623,807 A | 4/1899 | Myers |
| 1,179,823 A | 4/1916 | Greene |
| 1,912,958 A | 6/1933 | Widener |
| 1,977,734 A | 10/1934 | Monckmeier |
| 2,179,163 A | 11/1939 | Roth |
| 3,251,520 A | 5/1966 | Van Dyke et al. |
| 3,529,737 A | 9/1970 | Daugherty |
| 3,744,689 A | 7/1973 | Kjensmo |
| 3,891,132 A * | 6/1975 | Chandler .................... 224/536 |
| 3,972,456 A | 8/1976 | Saffold |
| 3,993,229 A | 11/1976 | Summers |
| 4,088,253 A | 5/1978 | Saffold |
| 4,125,214 A | 11/1978 | Penn |
| 4,171,077 A | 10/1979 | Richard, Jr. |
| 4,213,729 A | 7/1980 | Cowles et al. |
| 4,360,135 A | 11/1982 | Goble |
| 4,403,716 A | 9/1983 | Carlson et al. |
| 4,437,597 A | 3/1984 | Doyle |
| 4,524,893 A | 6/1985 | Cole |
| 4,702,401 A | 10/1987 | Graber et al. |
| 4,815,638 A | 3/1989 | Hutyra |

(List continued on next page.)

FOREIGN PATENT DOCUMENTS

| | | |
|---|---|---|
| DE | 4330019 | 3/1995 |
| DE | 19934384 | 1/2001 |

*Primary Examiner*—Gary E. Elkins
(74) *Attorney, Agent, or Firm*—Boyle Fredrickson Newholm Stein & Gratz S.C.

(57) ABSTRACT

A ride ready vehicle-mounted bicycle carrier includes a pair of spaced apart wheel supports and a stabilizing member which is engageable with the bicycle, preferably with one of the bicycle wheels, at a location above the wheel supports. One of the wheel supports is in the form of a pair of spaced apart wheel engagement members which are pivotably mounted to a structural member associated with the carrier, and which are configured to grip the wheel so as to provide initial support for the bicycle on the carrier. The stabilizing member is in the form of a clamp arm mechanism having a base mounted to the structural member and an extendible and retractable arm having a wheel-engaging portion at its outer end, which can be moved into and out of engagement with the wheel. The clamp arm mechanism is located between the wheel support members, and is arranged to apply a vertical downward force on the wheel at a location between the wheel engagement members, to provide a secure three-point engagement of the wheel and thereby to provide stable mounting of the bicycle to the carrier.

30 Claims, 7 Drawing Sheets

U.S. PATENT DOCUMENTS

| | | | |
|---|---|---|---|
| 4,823,997 A | 4/1989 | Krieger | |
| 4,875,608 A | 10/1989 | Graber | |
| 4,877,169 A | 10/1989 | Grim | |
| 5,029,740 A | 7/1991 | Cox | |
| 5,169,042 A | 12/1992 | Ching | |
| 5,445,300 A | 8/1995 | Eipper et al. | |
| 5,497,927 A | 3/1996 | Peterson | |
| 5,570,825 A * | 11/1996 | Cona | 224/537 |
| 5,579,973 A | 12/1996 | Taft | |
| 5,624,063 A | 4/1997 | Ireland | |
| 5,692,659 A | 12/1997 | Reeves | |
| 5,709,521 A * | 1/1998 | Glass et al. | 224/324 |
| 5,730,343 A | 3/1998 | Settelmayer | |
| 5,794,828 A | 8/1998 | Colan et al. | |
| 5,833,074 A | 11/1998 | Phillips | |
| 5,845,828 A | 12/1998 | Settelmayer | |
| 5,988,403 A | 11/1999 | Robideau | |
| 6,010,048 A | 1/2000 | Settelmayer | |
| 6,053,336 A | 4/2000 | Reeves | |
| 6,089,430 A | 7/2000 | Mehls | |
| 6,149,039 A * | 11/2000 | Englander | 224/324 |
| 6,164,508 A | 12/2000 | van Veenen | |
| 6,460,743 B2 | 10/2002 | Edgerly et al. | |
| 6,523,731 B1 | 2/2003 | Pedrini | |

\* cited by examiner

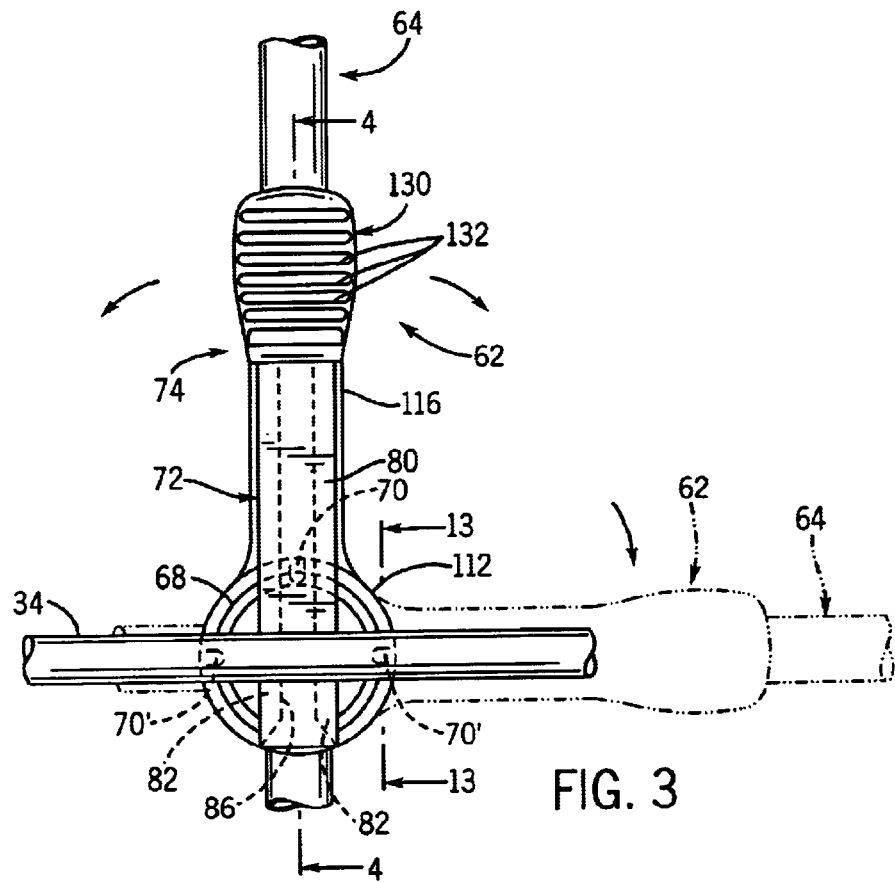
FIG. 3
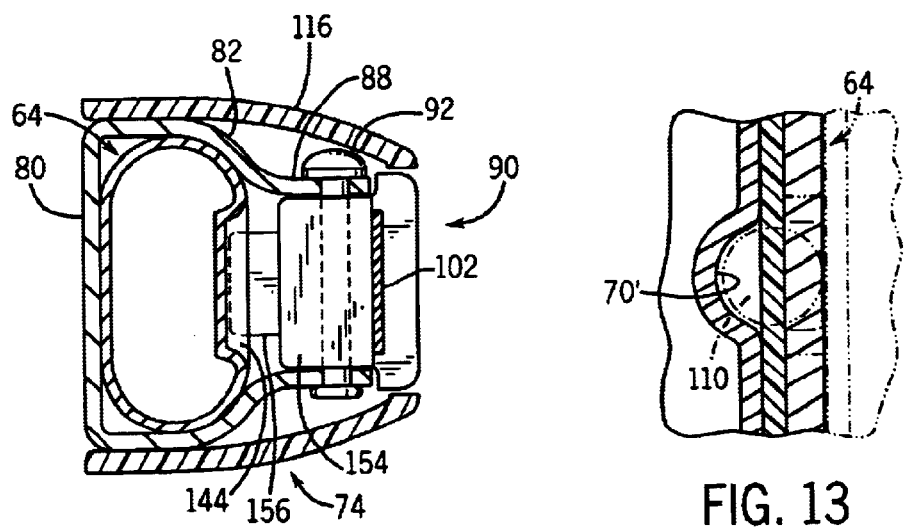
FIG. 10
FIG. 13

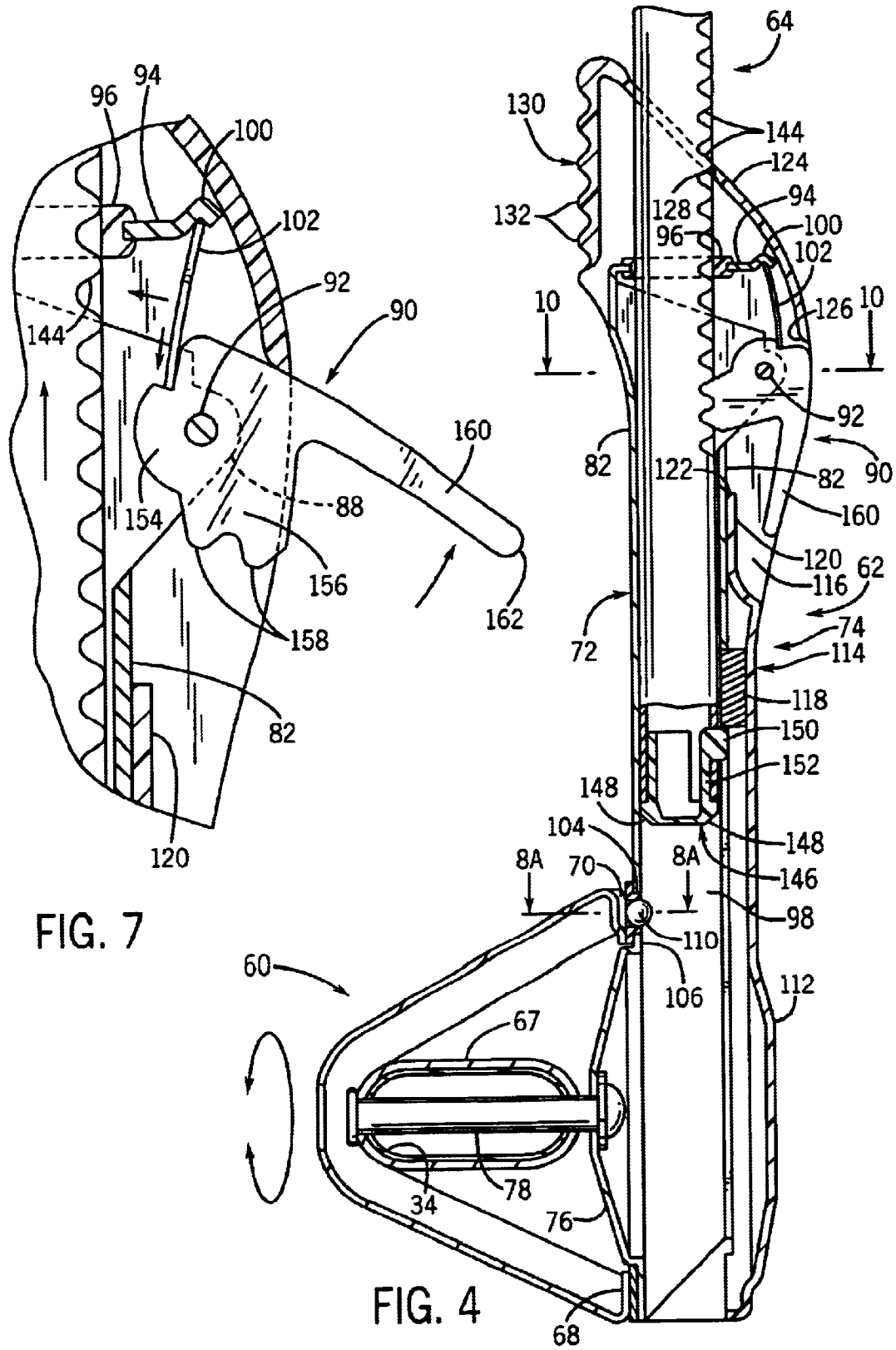

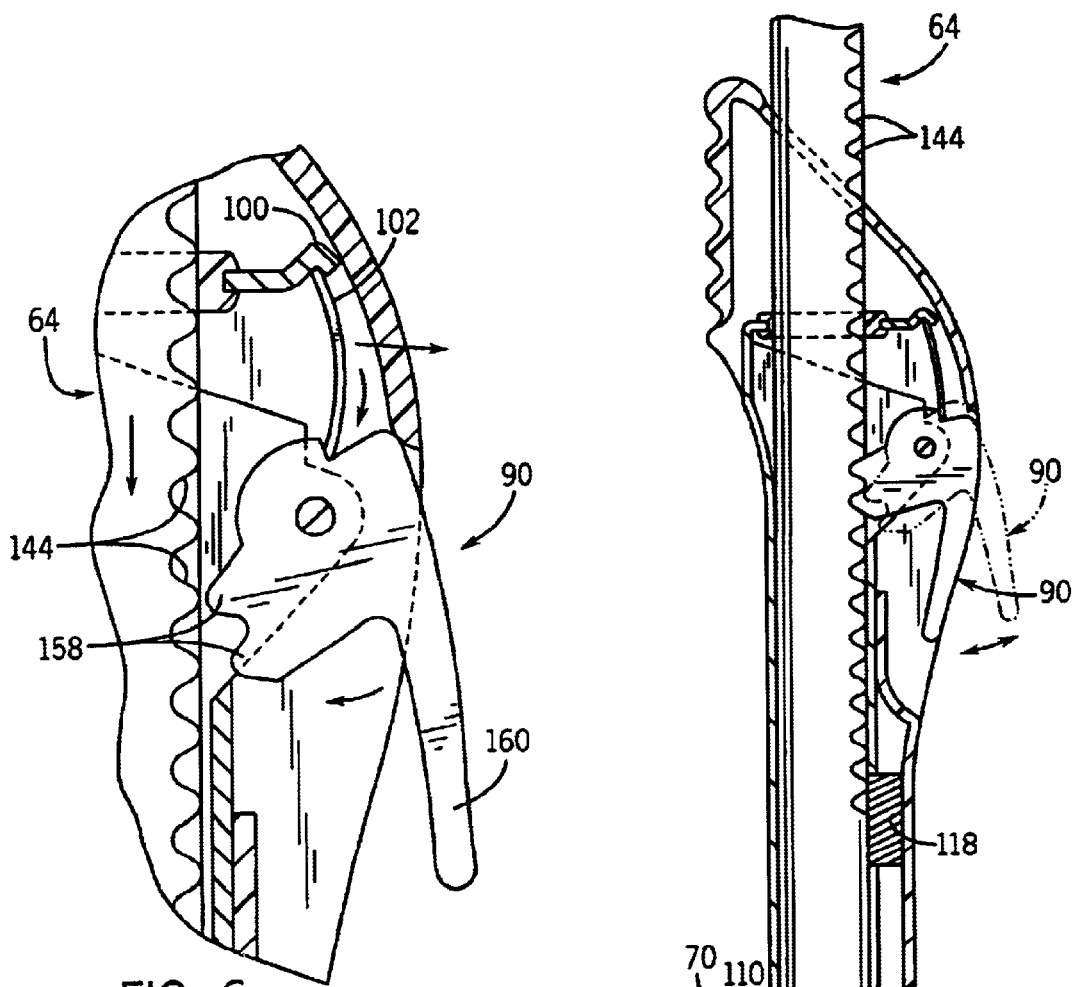
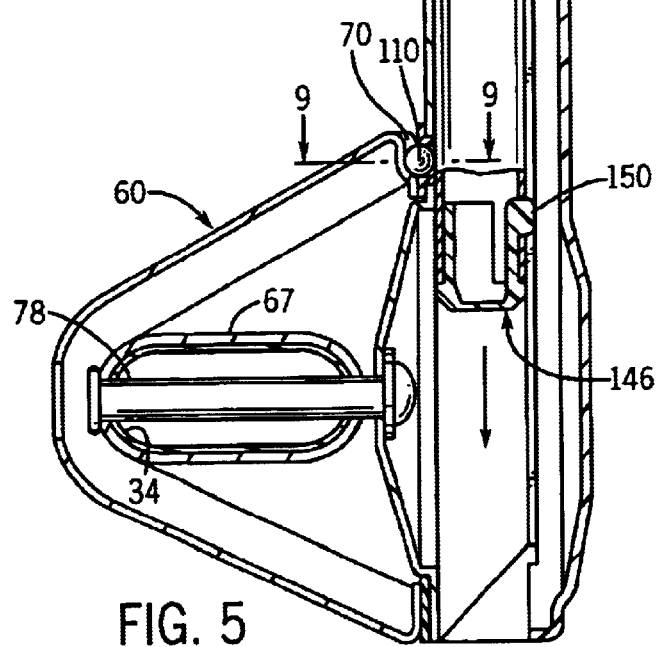
FIG. 6
FIG. 5

RIDE READY VEHICLE-MOUNTED BICYCLE CARRIER

CROSS-REFERENCE TO RELATED APPLICATIONS

This application claims the benefit of U.S. Provisional Application Serial No. 60/314,428, filed Aug. 23, 2001.

BACKGROUND AND SUMMARY OF THE INVENTION

This invention relates to vehicle-mounted bicycle carriers, and more particularly to a bicycle carrier which allows the bicycle to be mounted to the carrier in a ride-ready fashion, without the need to remove one of the bicycle wheels.

Various types of vehicle-mounted bicycle carriers are known, which enable a bicycle to be transported on a vehicle. Fork mount bicycle carriers typically have a rear wheel support and require the user to disengage the front wheel of the bicycle using a conventional quick release mechanism associated with the hub of the bicycle wheel. While these types of bicycle carriers provide secure and stable engagement of the bicycle with the carrier, the requirement to remove the front wheel of the bicycle entails time and effort which is inconvenient to the bicycle user. Typical hitch-mounted carriers suspend the bicycle from the top tube of the bicycle frame. While these types of bicycle carriers function satisfactorily for many types of bicycles, many bicycle frames do not have a conventionally configured top tube, and are thus not well suited for use with this type of carrier. While a bicycle beam can be temporarily connected between the seat post and handle bar post to provide a member which can be engaged with this type of carrier in order to suspend the bicycle, this entails use of an additional piece of equipment which must be purchased and be kept at the ready whenever it is desired to transport the bicycle. Further, while this type of carrier allows the bicycle wheels to remain engaged with the bicycle, provisions must be made to minimize swinging or swaying of the bicycles during transport, by stabilizing the bicycles vertically above or below the point of engagement with the rack. Suspension-type carriers of this type have been developed, and an example is illustrated in copending application Ser. No. 09/668,437 filed Sep. 22, 2000, the disclosure of which is hereby incorporated by reference. While this type of support arrangement provides stability against swinging movement and also provides a flexible mounting arrangement for various types of bicycle frames, there nonetheless are certain frame designs which simply are not well suited for use with suspension-type carriers. Further, while this system provides a certain amount of stability against swinging movement of the bicycles during transport, it remains possible for certain components of the bicycle, e.g. the front wheels, to come into contact during transport since such components are not stabilized against movement when the bicycle is engaged with the carrier.

Another type of bicycle carrier, which provides ride ready operation, incorporates front and rear wheel trays which receive the front and rear wheels of the bicycle, in combination with a stabilizing member which engages a portion of the bicycle vertically above the wheel trays. Some designs provide such stability by engaging the pedal crank or one of the bicycle frame components, e.g. the down tube or seat tube. Other designs engage an upper area of one of the bicycle tires so as to provide stability when the bicycle is mounted to the carrier. Examples of designs of this type are shown in Reeves U.S. Pat. No. 5,692,659 and Cole U.S. Pat. No. 4,524,893. The '893 patent illustrates a carrier of this type with a pivotable stanchion which is pivoted over the bicycle wheel when both wheels are received within a tray. The stanchion includes a wheel clamping mechanism for maintaining engagement of the wheel with the stanchion. The '659 patent illustrates a carrier with a wheel-receiving well for receiving one of the bicycle wheels, and a frame which supports the other of the bicycle wheels. A wheel-engaging arm is pivotably mounted to the frame. The arm includes an extendible outer portion having a wheel-engaging hook at its outer end, and which is movable inwardly and outwardly relative to an inner portion pivotably interconnected with the frame. A spring biases the outer portion of the arm inwardly, to force the outer hook portion into engagement with the wheel so as to stabilize the bicycle. While the design illustrated in the '893 patent is capable of mounting a bicycle in a ride-ready fashion to a vehicle, it is disadvantageous in that the bicycle is not supported when the bicycle is initially engaged with the carrier. This requires the user to stabilize the bicycle with one hand while using the other hand to pivot the stanchion over the wheel. While the design in the '659 patent is operable to engage the bicycle with the carrier in a ride-ready fashion, it is also somewhat disadvantageous in that the frame structure, which provides initial support for the bicycle when engaged with the carrier, involves heavy tubular members which are specially formed to define the wheel well and the remaining portions of the frame. The rack thus has a significant amount of weight, and has associated costs of manufacture which are significant in view of the amount of material required and the number of forming steps involved in manufacturing the frame. Further, the arm can be engaged with the wheel at any location along the circumference of the wheel. This design thus relies upon the user to properly position the arm relative to the wheel so as to ensure that the arm clamps the wheel into the wheel well. Further, the designs in both the '659; and '893 patents leave the wheel hub exposed, which makes it possible to access the wheel hub and to utilize the quick-release mechanism of the wheel hub to disengage the bicycle frame from the wheel, which can lead to theft of the bicycle when mounted to the carrier.

It is an object of the present invention to provide a ride-ready bicycle carrier capable of quickly and easily mounting various types and sizes of bicycles. It is a further object of the invention to provide such a bicycle carrier which is capable of supporting the bicycle in a hands-free manner when the bicycle is initially engaged with the carrier. A still further object of the invention is to provide such a bicycle carrier which incorporates a stabilizing member configured and arranged to provide positive engagement of the bicycle wheel with the carrier. Yet another object of the invention is to provide such a bicycle carrier which engages one of the bicycle wheels in a similar engagement configuration for all sizes of bicycle wheels. A still further object of the invention is to provide such a bicycle carrier which obstructs access to a quick release mechanism associated with the bicycle wheel, to prevent theft of the bicycle when engaged with the carrier. A still further object of the invention is to provide such a bicycle carrier which is relatively simple in its components and construction, and which provides quick and easy mounting of the bicycle to the carrier while providing positive engagement of the bicycle with the carrier so as to prevent movement of the bicycle during transport.

In accordance with the invention, a vehicle-mounted bicycle carrier includes first and second wheel support sections which engage respective first and second wheels of the bicycle, in combination with a stabilizing member which engages the bicycle at a location above the first and second wheel support sections. At least one of the wheel support sections includes a pair of spaced apart pivotable wheel engagement members. The wheel engagement members define wheel engaging areas adapted to engage a lower part of the wheel in spaced apart locations. The wheel support sections, including the wheel engagement members, are mounted to a pair of structural members associated with the carrier. The structural members may be in the form of opposite end portions of a frame member forming a part of the carrier and mounted to a tubular member adapted to engage a hitch associated with the vehicle. Alternatively, the structural members may be separate from each other, and may be carried by a hitch-type mounting arrangement or by a roof-type mounting arrangement.

Each wheel engagement member preferably has an arcuate wheel engagement surface engageable with the wheel. The stabilizing member is preferably located between the wheel engagement members, and is oriented so as to apply a downward force on the wheel at a location between the wheel engagement members. With this construction, the stabilizing member and the wheel engagement members provide three-point securement of the wheel to the carrier, to stabilize the bicycle when mounted to the carrier. The wheel engagement areas are preferably configured so as to grip the side areas of the wheel when the wheel is initially placed into engagement with the wheel engagement members, to provide a self-supporting feature for allowing the user to operate the stabilizing member without having to stabilize the bicycle with one hand.

The stabilizing member is preferably in the form of a base portion interconnected with a structural member associated with the carrier, and an arm mounted for extension and retraction to the base portion. The arm includes a wheel-engaging area, such as a hook, at its upper end, and a releasable latching mechanism is interposed between the arm and the base portion. The releasable latching mechanism is operable to selectively maintain the wheel engaging area of the arm in engagement with the wheel, and to release engagement between the arm and the base portion for allowing the arm to be extended so as to disengage the wheel and allow the bicycle to be removed from engagement with the carrier. The arm may have a series of teeth formed in one of its surfaces, and the releasable latching mechanism is selectively engageable with the teeth so as to selectively maintain the position of the arm relative to the base portion.

The base portion may be mounted to the structural member of the carrier for pivoting movement between a raised position and a lowered position. When in the raised position, the base portion extends vertically upwardly from the structural member between the wheel engagement members, and the arm is extendible and retractable in a vertical direction relative to the base portion. A blocking mechanism is interposed between the arm and the base portion for preventing the arm from being moved downwardly into engagement with the wheel unless the arm is in its upright position. In this manner, it is ensured that the arm is in a vertical orientation between the wheel engagement members, so as to apply a vertical downward force on the wheel between the engagement members when the arm is retracted to move the wheel engaging area of the arm into engagement with the wheel. When the base portion is in its upright position, an upper end of the base portion is in alignment with and located adjacent the hub of the wheel, due to the centering of the wheel between the pivoting wheel engagement members. The presence of the base portion prevents movement of the quick release lever of the wheel to a release position, so as to ensure that the bicycle cannot be disengaged from the wheel when the bicycle is mounted to the carrier.

The other one of the wheel support sections engages the other bicycle wheel, preferably the rear wheel. A rear wheel retainer is movable into engagement with the rear wheel, for selectively maintaining the rear wheel in engagement with the rear wheel support section. The rear wheel retainer is mounted to a structural member associated with the carrier, by means of a mounting portion and an engagement portion which is rotatably mounted to the mounting portion into and out of engagement with the rear wheel. The mounting portion can be axially moved relative to the structural member so as to enable the rear wheel retainer to be positioned as desired relative to the rear wheel and the rear wheel support section.

The invention further contemplates an improvement in a vehicle-mounted bicycle carrier as well as a method of securing a bicycle to a vehicle, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a partial section view taken along line 3—3 of FIG. 2;

FIG. 4 is a partial section view taken along line 4—4 of FIG. 3, showing the latch mechanism incorporated into the base portion of the stabilizing member in an engaged position;

FIG. 5 is a view similar to FIG. 4, showing the arm of the stabilizing member moved downwardly for engagement with the bicycle wheel;

FIG. 6 is an enlarged partial section view of the latch member construction incorporated into the base portion of the stabilizing member illustrated in FIG. 5;

FIG. 7 is a view similar to FIG. 6, showing the latch member in its disengaged position;

FIG. 10 is a section view taken along line 10—10 of FIG. 4;

FIG. 13 is a partial section view taken along line 13—13 of FIG. 3; and

DETAILED DESCRIPTION OF THE INVENTION

Figure 1:
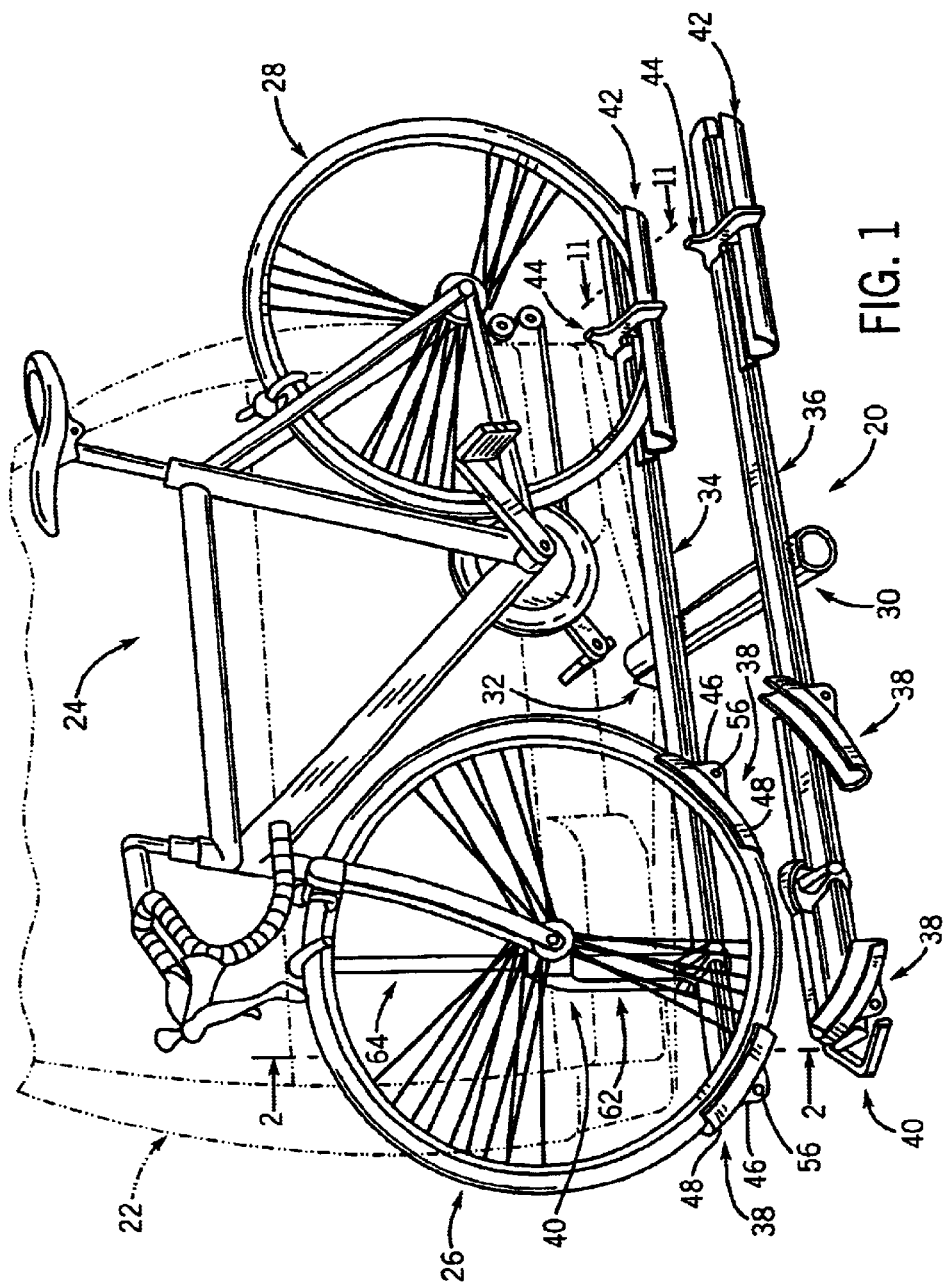
FIG. 1 is an isometric view showing a hitch-type version of a ride ready vehicle-mounted bicycle carrier constructed according to the invention.

FIG. 1 illustrates a bicycle rack or carrier 20 adapted for mounting to the hitch of a vehicle, shown at 22, for transporting a bicycle 24. Bicycle carrier 20 is adapted to carry bicycle 24 in a ride-ready fashion, and provides quick and easy mounting of bicycle 24 to carrier 20 and removal of bicycle 24 from carrier 20. In a manner to be explained, carrier 20 engages the front and rear wheels, shown at 26, 28, respectively, of bicycle 24 for retaining bicycle 24 in position on carrier 20.

Carrier 20 includes an axial central support member 30, in the form of a tubular member, which extends rearwardly from a hitch attachment mechanism 32 adapted for engagement with the trailer hitch of vehicle 22. Hitch attachment mechanism 32 may be in the form of a mounting bracket to which central support member 30 is connected for movement between and operative extended position as shown, and an inoperative stowed position in which central support member 30 is positioned in an upright orientation. Representatively, such a mounting bracket is illustrated in copending application Ser. No. 10/271,075 filed Oct. 15, 2002, the disclosure of which is hereby incorporated by reference, although it is understood that any other satisfactory type of mounting mechanism may be employed.

Carrier 20 includes a pair of structural cross members 34, 36 secured to central support member 32 in any satisfactory manner such as by welding. Structural cross members 34, 36 are adapted to support a bicycle 24 in a manner to be explained. While carrier 20 is shown and described as having two (2) structural cross members for supporting two bicycles, it is understood that any number of structural cross members such as 34, 36 may be utilized to mount any desired number of bicycles, e.g. one, two, three, four or any other desired number. Further, while structural cross members 34, 36 are illustrated as being of one-piece construction extending outwardly from opposite sides of central support member 30, it is understood that each structural cross member may alternatively be two separate pieces extending outwardly from opposite sides of central support member 30.

Generally, each structural cross member, such as 34, of carrier 20 includes a pair of front wheel support members 38 and a stabilizer in the form of a clamp arm mechanism 40 interconnected with structural cross member 34 on one side of central support member 30, in combination with a rear wheel support member 42 and a rear wheel retainer 44 interconnected with structural cross member 34 on the opposite side of central support member 30. A similar set of components is mounted to each additional structural cross member, such as 36, for use in mounting additional bicycles to bicycle carrier 20.

Figure 2:
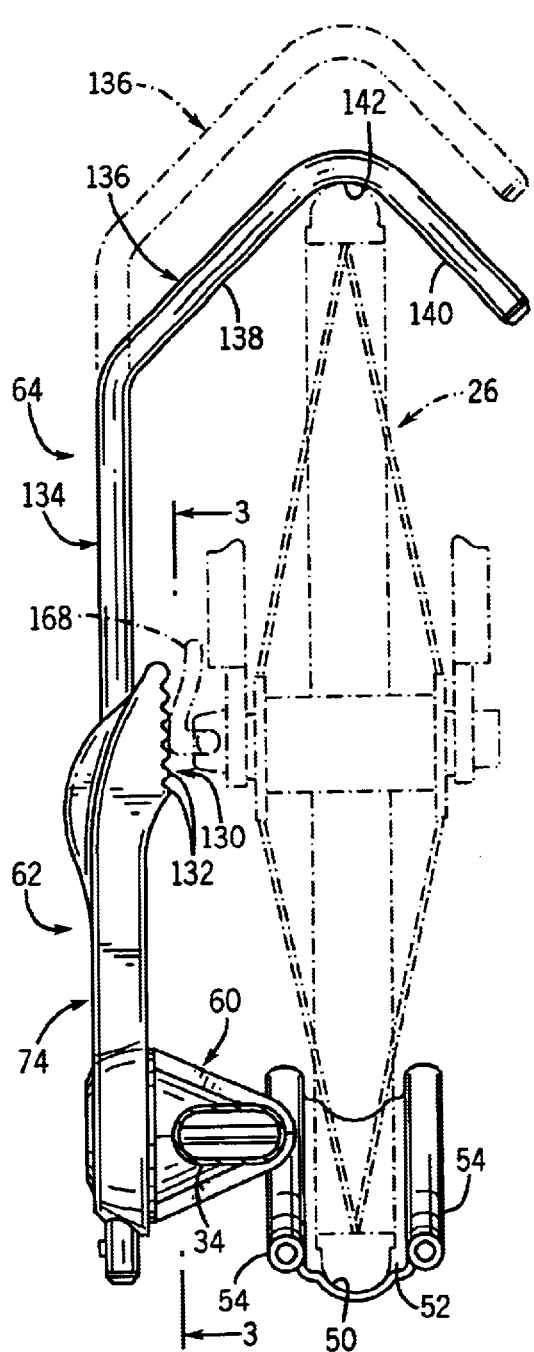
FIG. 2 is a partial section view taken along line 2—2 of FIG. 1.

Referring to FIGS. 1 and 2, each front wheel support member 38 includes a boss 46 and a wheel engagement member 48 which defines wheel engagement areas extending outwardly in opposite directions from boss 46. Each wheel engagement member 48 is in the form of a trough having a relatively narrow outer portion 50 and a wide inner portion 52. Each wheel engagement member 48 is arcuate in shape, and has rolled inner and outer side edges 54. A pivot bolt 56 extends through a transverse passage formed in each boss 46, and through aligned openings in the walls of structural cross member 34. With this construction, each front wheel support member 38 is pivotable about a pivot axis defined by pivot bolt 56. Arcuate wheel engagement members 48 are adapted to engage a bicycle wheel such as front wheel 26 in the lower area of the wheel, and to support the wheel at spaced apart locations. The spacing between front wheel support members 38 as well as the length of engagement members 48 are selected such that front wheel support members 38 are capable of receiving and engaging all sizes of bicycle wheels, from the smallest juvenile bicycle to the largest adult bicycle. Narrowed outer trough portion 50 is adapted to receive narrower bicycle tires such as are found on racing or street bicycles, and wide inner trough portion 52 is adapted to receive wider bicycle tires such as are found on juvenile and mountain bicycles.

As shown in FIG. 2, clamp arm mechanism 40 includes a shell or hub 60 secured to structural cross member 34, a base 62 pivotably mounted to hub 60, and an arm 64 which is mounted for inward and outward movement to base 62. In a manner to be explained, clamp arm mechanism 40 is adapted to engage the upper portion of front wheel 26 at a location between front wheel support members 38, for clamping front wheel 26 to structural cross member 34.

Referring to FIG. 4, hub 60 is in the form of a generally conical member having side walls 66 and an internal tubular wall 67 which defines a passage within which structural cross member 34 is received. Hub 60 further includes an outwardly facing outer ring 68 within which a pair of recesses 70 are formed.

Base 62 includes an inner tubular member in the form of an insert 72, in combination with a cover 74. Insert 72 defines a lower convex wall 76 having a central opening through which a pin 78 extends. Pin 78 further extends through aligned openings in the walls of structural cross member 34. Pin 78 is in the form of a rivet, and the shank of pin 74 defines a pivot axis about which insert 72, and thereby base 62, is pivotable relative to hub 60 and structural cross member 34.

Insert 72 is in the form of a tubular stamped and rolled steel member having a generally D-shaped cross section. As shown in FIG. 10, insert 74 includes a front wall 80 and a pair of arcuate side walls 82 extending outwardly therefrom. Each side wall 82 terminates in an end 84, and side wall ends 84 face each other to define an axially extending slot 86 (FIG. 3) therebetween. At its upper end, each side wall 82 is formed so as to flare rearwardly and extend parallel to the other side wall, defining a pair of mounting ears 88 (FIG. 10). A latch lever 90 is pivotably mounted between ears 88 via a pivot pin 92 that extends between and is connected to ears 88. Insert 72 further defines a top wall 94 which is in the form of a rearwardly bent upward extension of front wall 80. An oval opening is formed in top wall 94, and an oval ring 96 formed of a resilient material such as Santoprene, is engaged within the opening. Ring 96 defines an opening through which arm 64 extends, having a shape corresponding to the cross sectional shape of arm 64. The opening in top wall 94 is in alignment with an internal passage defined by insert 72, shown at 98 (FIG. 4). At its rearward end, top wall 94 defines a downwardly facing lip 100. A flat spring 102 is engaged at its upper end with lip 100, and at its lower end with latch lever 90, in a manner to be explained.

Figure 8A:
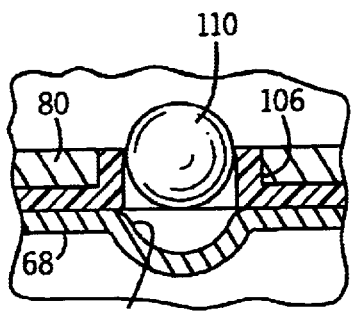
FIG. 8a is a partial section view taken along line 8a—8a of FIG. 4, showing the position of a ball-type positioning arrangement for ensuring that the base member is in an upright position prior to lowering of the arm member.
Figure 8B:
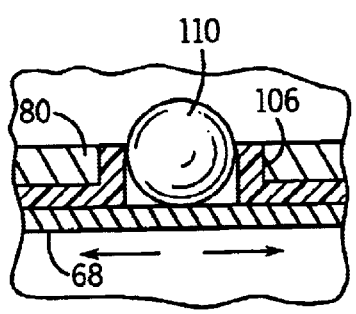
FIG. 8b is a view similar to FIG. 8a, showing the position of the ball-type mechanism when the base member is other than in an upright position.

Referring to FIGS. 4 and 8a, curved arcuate glide members 104 are engaged within openings formed in insert front wall 82. Glide members 104 are formed of a low friction material such as Derlin. Each glide member 104 is adapted to engage outer ring 68 of hub 60, to facilitate pivoting movement of base 62 relative to hub 60.

Each glide 104 further includes an annular ring 106 which extends into a corresponding opening formed in insert front wall 80. Ring 106 defines a passage 108, and a retainer ball 110 is received within passage 108 in the upper one of glide members 104. The inner surface of ring 106 is formed so as to be convergent in a forward-to-rearward direction, to maintain retainer ball 110 in position within passage 108. The function and operation of retainer ball 110 will later be explained.

Cover 74 defines a circular lower end portion 112 (FIG. 3) which surrounds the lower end of insert 72, located forwardly of outer ring 68 defined by hub 60. Above outer lower end portion 112, cover 74 defines a channel-shaped configuration including a rear wall 114 and a pair of side walls 116. Rear wall 114 and side walls 116 define an open passage within which insert 72 is received, and are configured such that insert front wall 80 is exposed in a rearwardly facing direction. A stop member 118 is formed integrally with cover rear wall 114, and extends into and through slot 86 defined by insert 72. Above stop member 118, cover rear wall 114 is formed so as to define a ramp 120 terminating in an upper end 122. Cover side walls 116 extend outwardly from ramp 120, and define an open area between which latch lever 90 is located. Above latch lever 90 and located outwardly of spring 102, cover 74 defines a curved top wall 124 which terminates in a lower end 126 located above latch lever 90. Cover top wall 124 is configured so as to merge with cover side walls 116. An opening 128 is formed in cover top wall 124, and arm 64 extends through opening 128. Cover 74 further includes a rear face 130 having a series of ridges 132 forming depressions therebetween, the function of which will later be explained.

Referring to FIG. 2, arm 64 includes an axially extending main section 134 and a hook-shaped wheel engaging section 136 located at the outer end of main section 134. Arm 64 is formed of any satisfactory material, such as bent elliptical tubing, formed such that main section 134 extends along a longitudinal axis and wheel-engaging section 136 is formed to define an inner section 138 which extends rearwardly at an angle relative to main section 134, and an outer section 140 which extends substantially perpendicularly relative to inner section 138. A wheel engagement area 142 is defined at the intersection of inner section 138 and outer section 140.

The outer surface of arm main section 134 is formed with a series of teeth 144 in a manner as is known.

An end cap 146 is engaged with the lower end of arm main section 134. End cap 146 includes a beveled downwardly facing actuator surface 148 and an engagement member 150 which extends outwardly through an opening formed in the rear wall of arm main section 134. Engagement member 150 is formed on a tongue 152 defined by end cap 146, which enables engagement member 150 to be depressed when end cap 146 is engaged with the end of arm main section 134, and to snap into the opening in the rear wall of arm main section 134 so as to maintain end cap 146 in engagement with arm 64. Engagement member 150 extends outwardly from the rearward surface of arm main section 134.

As shown in FIGS. 4 and 10, latch lever 90 includes a hub section 154 defining a transverse passage through which pin 92 extends, for pivotably mounting latch lever 90 between ears 88. Latch lever 90 further includes an arm engaging section 156 extending from hub 154, and defining a pair of teeth 158. A lever handle 160 extends from hub 154, terminating in a lower end 162. Hub 154 includes a notch 164 within which the lower end of spring 102 is received.

Latch lever 90 is pivotable between an engaged position as shown in FIG. 4 and in solid lines in FIG. 5, and a release position as shown in FIG. 7. Flat spring 102 provides an over-center bias on latch lever 90 during pivoting movement of latch lever 90 about pin 92.

In operation, clamp arm mechanism 40 functions as follows to maintain bicycle front wheel 26 in engagement with front wheel support members 38. Initially, arm 64 is moved outwardly relative to base 62 to an extended position, as shown in phantom in FIG. 2, in which wheel-engaging section 136 is moved upwardly away from structural cross member 34. The user then engages bicycle front wheel 26 with front wheel support members 38 by lifting bicycle 24 above carrier 20, aligning front wheel 26 with front wheel support members 38, and then lowering front wheel 26 into engagement with front wheel support members 38. Simultaneously, the user lowers bicycle rear wheel 28 onto rear wheel support member 42. As bicycle front wheel 26 is lowered into engagement with front wheel support member 38, front wheel support members 38 pivot about pivot bolts 56 and cradle the lower portion of front wheel 26 at spaced apart points of engagement above the lower extent of front wheel 26. The configuration of wheel engagement members 48 is such that the side edges of wheel 26 are gripped by engagement members 48, to loosely support bicycle 24 in a manner sufficient to prevent bicycle 24 from tipping over when initially engaged with carrier 20 in this manner. The user then manually engages arm 64, typically by grasping wheel-engaging section 136, and applies a downward force to arm 64 so as to cause downward movement of arm 64 into and through passage 98 defined by inserts 72. Before commencing downward movement of arm 64, the user manually pivots latch lever 90 toward its engaged position of FIG. 4, such that spring 102 applies a clockwise biasing force on latch lever 90. During such downward movement of arm 64, arm teeth 144 and latch member teeth 158 provide a ratchet-type action, in which arm teeth 144 are moved past latch lever teeth 158 during downward movement of arm 64. Spring 102 continually biases latch lever 90 such that latch lever teeth 158 are engaged with arm teeth 144.

Figure 9:
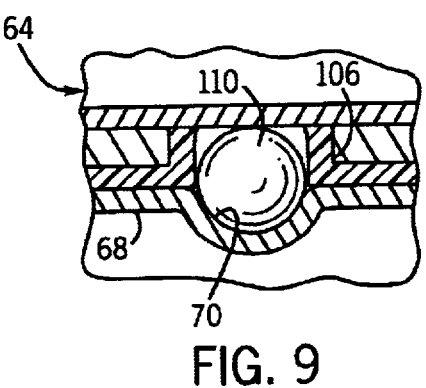
FIG. 9 is a partial section view taken along line 9—9 of FIG. 5.

When arm 64 is moved downwardly to a predetermined position, beveled actuator surface 148 comes into contact with retainer ball 110, which normally extends into insert passage 98. If base 62 is pivoted so as to extend in a vertically upright manner relative to structural cross member 34, ball 110 is in alignment with recess 70 in hub outer ring 68, as shown in FIG. 8*a*. As arm 64 is moved downwardly, beveled actuator surface 148 engages ball 110 so as to force ball 110 outwardly into recess 70, as shown in FIG. 9. If base 62 is not positioned vertically in this manner, retainer ball 110 will not be in alignment with recess 70, such that engagement of beveled actuator surface 148 with ball 110 prevents downward movement of arm 64. This ensures that arm 64 can only be lowered when base 62 is in a vertical orientation, so as to ensure that arm 64 applies a vertical downward clamping force on bicycle front wheel 26.

Once base 62 is positioned vertically in this manner, beveled actuator surface 148 forces retainer ball 110 into recess 70, such that base 62 cannot then be rotated relative to hub 60, and the user then continues application of the downward force to arm 64 so as to bring wheel engagement area 142 of wheel-engaging section 136 into engagement with the upper extent of bicycle front wheel 26. The resiliency of the bicycle tire typically enables the user to press wheel engagement area 142 onto bicycle front wheel 26 so as to provide a sufficient force to firmly clamp bicycle front wheel 26 downwardly onto front wheel engagement members 38. The biasing force applied to latch lever 90 by spring 102 maintains latch lever teeth 158 in engagement with arm teeth 144, to maintain arm 64 in engagement with bicycle front wheel 26.

The self-centering feature provided by wheel engagement members 48 enables the upper end of base 62 to be positioned in alignment with the center of wheel 26 when bicycle 24 is mounted to carrier 20. In this manner, face 139 defined by the upper end of base 62 is in alignment with the quick release lever, shown at 168 (FIG. 2) typically associated with front wheel 26 of a bicycle, to prevent lever 168 from being pivoted outwardly its full extent and thereby to prevent disengagement of the bicycle fork from the front wheel skewer. The depressions formed by ridges 132 are configured to receive the outer end of the quick release hub to which quick release lever 168 is mounted. In this manner, the upper end of base 62 provides an anti-theft feature for carrier 20.

When it is desired to remove bicycle 24 from carrier 20, the user manually engages lower end 162 of latch lever handle 160, which is accessible through a space defined between handle 160 and ramp 120 of cover 74. The user pulls outwardly on latch lever handle 160, which rotates latch lever 90 in a counterclockwise direction about pivot pin 92, as shown in FIGS. 5 and 7. When latch lever 90 has been rotated an amount sufficient to move the lower end of spring 102 inwardly of the center of pivot pin 92, spring 102 applies a counterclockwise biasing force on latch lever 90, which biases latch lever 90 to its disengaged position of FIG. 7. The user then raises arm 64 such that wheel-engaging section 136 is moved upwardly out of engagement with bicycle front wheel 26. As arm 64 is moved upwardly relative to base 62, engagement member 150 of end cap 146 comes into contact with stop member 118 of cover 74, to prevent arm 64 from being fully withdrawn from base 62. In this manner, arm 64 is disengaged from bicycle front wheel 26, which can then be removed from engagement with front wheel support members 38.

When clamp arm mechanism 40 is not in use, arm 64 is extended and base 62 is pivoted downwardly to an inoperative position as shown in phantom in FIG. 3 and with respect to structural cross member 36 (FIG. 1). When base 62 is initially pivoted away from its upright position, retainer ball 110 contacts the angled wall of recess 70 so as to force retainer ball 110 inwardly into passage 108, so as to allow base 62 to pivot relative to hub 60. In the inoperative position, base 62 is parallel to structural cross member 34 and retainer ball 110 is in alignment with a recess 70' located on outer ring 68 at a 90° position relative to recess 70 as illustrated in FIG. 4. The user then again moves arm 64 inwardly into base 62 in the same manner as described previously, to engage retainer ball 110 within recess 70' to prevent rotation of base 62. The user manually returns latch lever 90 back toward its engaged position as shown in FIG. 6. When latch lever 90 is pivoted sufficiently to move the lower end spring 102 outwardly of the center of pivot pin 92, spring 102 then applies a clockwise biasing force which once again tends to move latch lever 90 toward its engaged position. As the user moves arm 64 into base 62 when clamp arm mechanism 40 is in its lowered position, latch lever 90 again functions to provide a ratcheting engagement of arm 64 to prevent outward movement of arm 64. Retainer ball 110 prevents pivoting movement of base 62, such that clamp arm mechanism 40 is stowed parallel to structural cross member 32 when not in use. The above-described steps are then reversed when it is desired to subsequently move clamp arm mechanism 40 away from its stowed position and to its operative position of FIG. 1, in preparation for subsequently mounting bicycle 24 to carrier 20.

Figure 11:
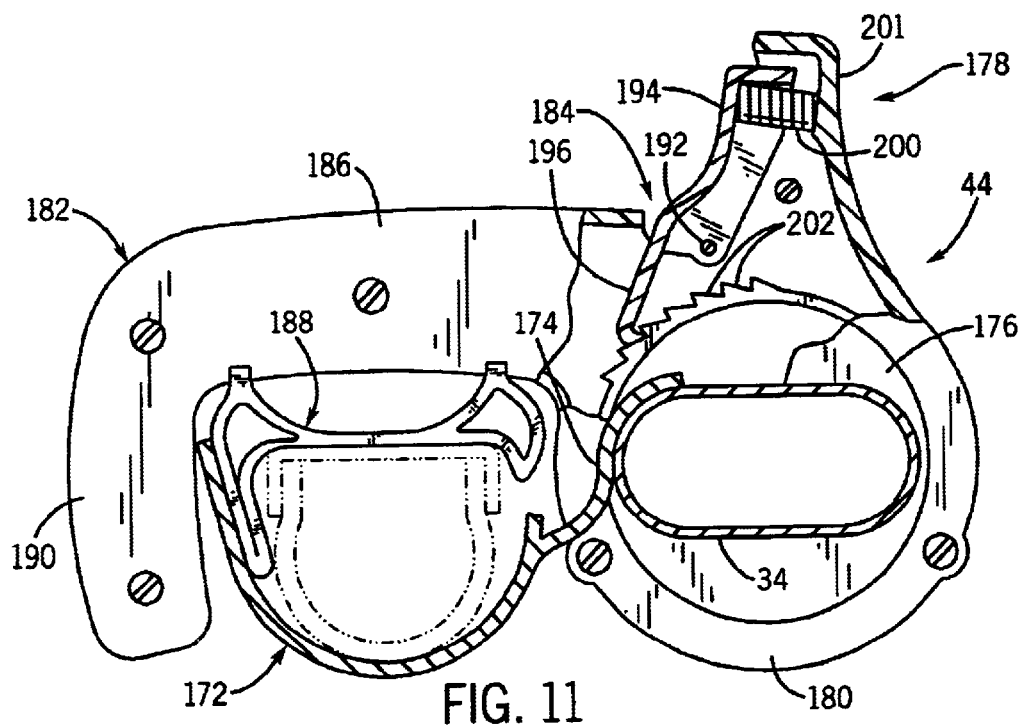
FIG. 11 is a partial section view taken along line 11—11 of FIG. 1, showing the rear wheel retainer in an engaged position.
Figure 12:
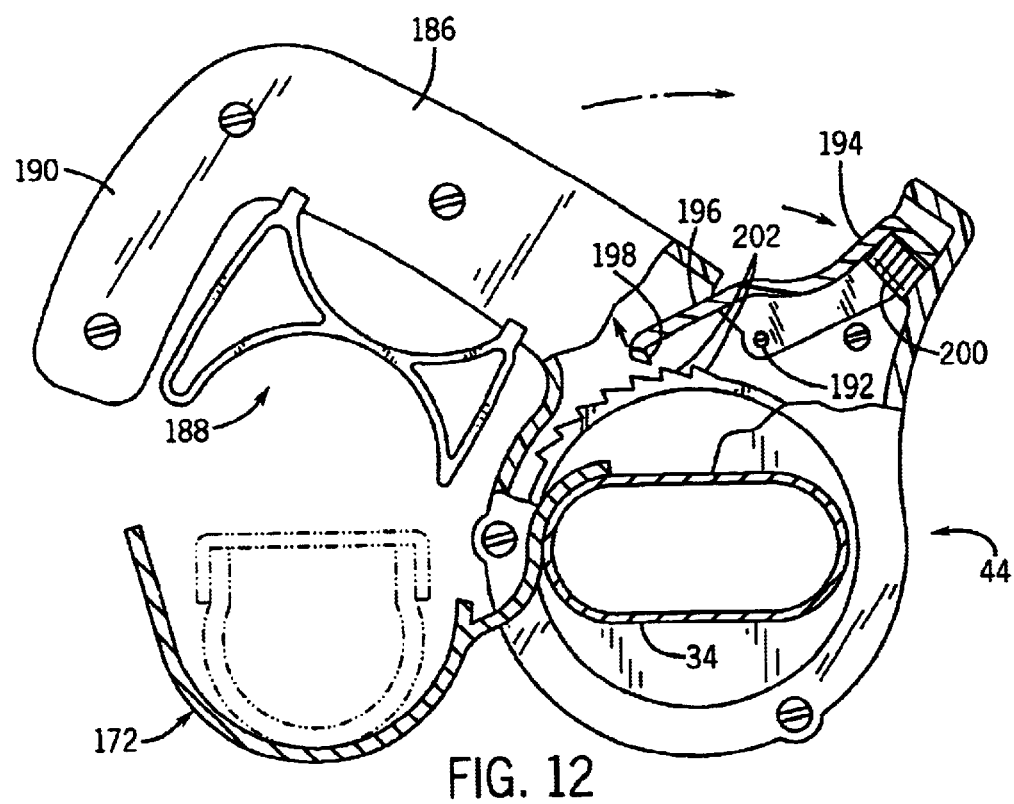
FIG. 12 is a view similar to FIG. 11, showing movement of the rear wheel retainer to a disengaged position.

FIGS. 11 and 12 illustrate the details of rear wheel support member 42 and rear wheel retainer 44, which function to support and retain bicycle rear wheel 28 in place when bicycle 24 is engaged with carrier 20.

Rear wheel support member 42 is in the form of an elongated trough or channel member 172, defining a flange 174 secured to structural cross member 34 in any satisfactory manner, such as by welding, so as to securely mount rear wheel support member 42 to structural cross member 34. Channel member 172 has a length sufficient to support the rear wheel of the bicycle when the bicycle front wheel is engaged with front wheel support members 38, with the length being sufficient to accommodate the full variety of available bicycle sizes.

Rear wheel retainer 44 is of two-piece construction, including an inner hub 176 which is mounted for sliding movement to structural cross member 34, and an outer engagement member 178 rotatably mounted to inner hub 176. Outer engagement member 178 includes a ring section 180 rotatably mounted to hub 176 in any satisfactory manner, in combination with an engagement section 182 and a trigger member 184. Engagement section 182 includes an arm 186 which extends outwardly from ring section 180, and which has a resilient, compressible engagement member 188 mounted to its lower edge, extending downwardly therefrom. Engagement section 182 further includes an end section 190 extending downwardly from the outer end of arm 186.

Trigger member 184 is pivotable about a pivot pin 192, and includes a manually engageable trigger wall 194 outwardly of pivot pin 192, and an inner engagement section member 196 which includes an engagement finger 198 at its outer end. A spring 200 is engaged between a trigger housing portion 201 of ring section 180 and trigger member 184, for biasing trigger member 184 in a counterclockwise direction. Inner hub 176 includes a series of teeth 202 throughout a portion of its outer peripheral surface, which are configured to engage finger 198 of engagement member 196 in various engagement positions, to selectively retain engagement member 178 in a closed position.

In operation, rear wheel retainer 44 functions as follows in order to retain bicycle rear wheel 28 in engagement with rear wheel support member 42. Initially, rear wheel retainer 44 is moved to an open position, such as shown in FIG. 12, wherein engagement section 182 is positioned sufficiently above rear wheel support member 42 so as to enable bicycle rear wheel 28 to be placed within channel member 172, as shown in FIGS. 11 and 12. When in its fully open position, finger 198 is clear of hub teeth 202. When bicycle rear wheel 28 has been positioned within channel member 172, rear wheel retainer 44 is slid to a desired position along the length of structural cross member 34, such that engagement section 182 is located within a space between a pair of spokes forming a part of rear wheel 28. The user then manually lowers engagement section 182, so as to pivot ring section 180 about inner hub 176 and to bring resilient engagement member 188 into contact with the rim of rear wheel 28, as shown in FIG. 11. In this position, arm 186 overlies the open upper end of channel member 172 and end section 190 extends downwardly past the outer edge of channel member 172. Finger 198 moves along teeth 202 in a ratchet-type fashion, and is biased into engagement with teeth 202 under the influence of spring 200. When engagement section 182 is in its desired position, the user releases manual engagement with engagement section 182, and engagement of finger 198 with teeth 202 maintains engagement section 182 in its engaged position, such as shown in FIG. 11. When it is desired to remove bicycle rear wheel 28 from rear wheel support member 42, the user manually depresses trigger wall 194, as shown in FIG. 12, to compress spring 200 and to move finger 198 out of engagement with teeth 202. Ring section 180 can thus be rotated on inner hub 176 in a clockwise direction as shown in FIG. 12, to remove resilient engagement member 188 from engagement with the rim of bicycle rear wheel 28, and to rotate engagement section 182 an amount sufficient to enable bicycle rear wheel 28 to be removed from channel member 172.

Figure 14:
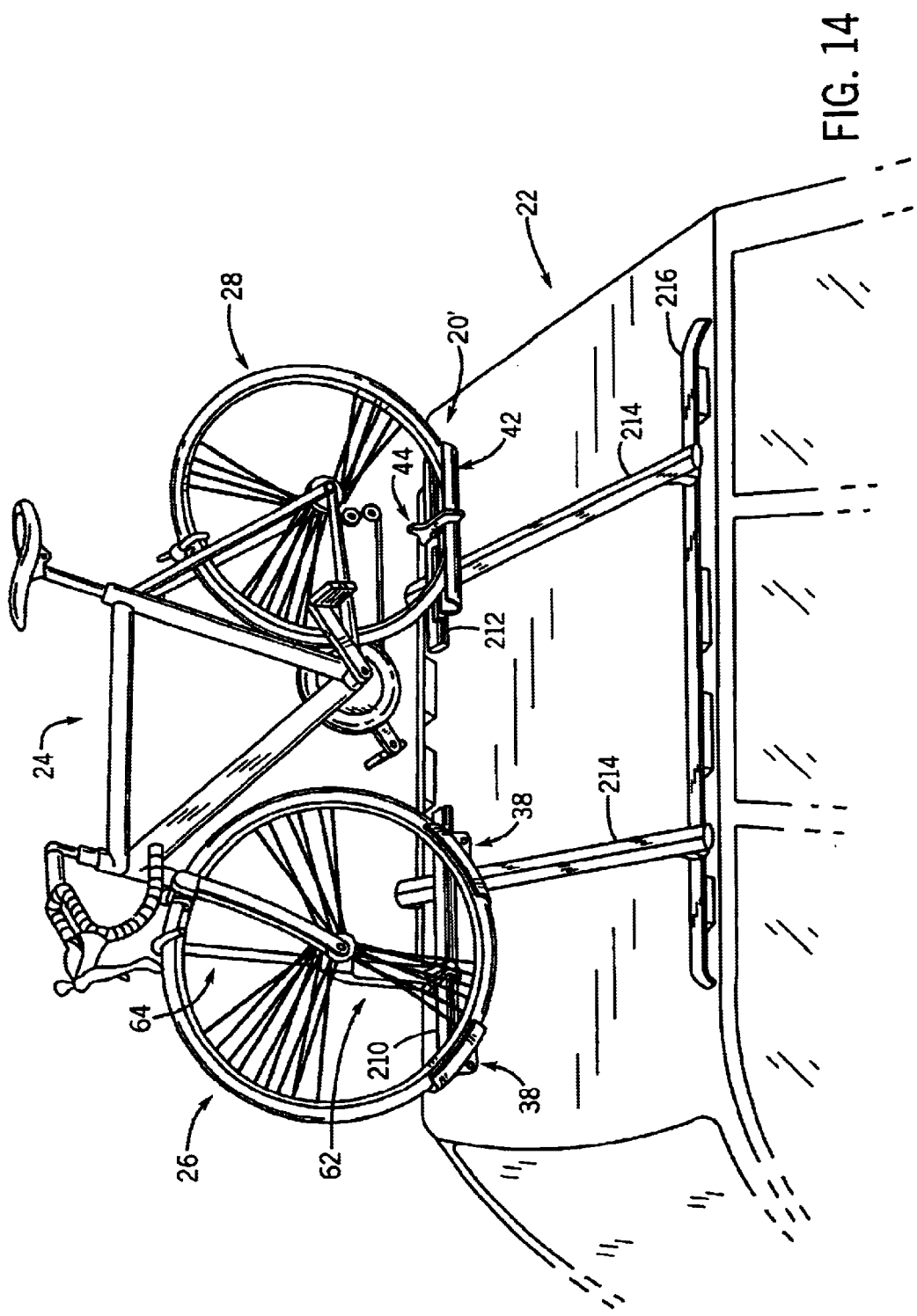
FIG. 14 is an isometric view illustrating a rooftop version of the bicycle carrier of the present invention.

FIG. 14 illustrates an alternative roof-mounted version of the bicycle carrier of the present invention, shown at 20'. In this version, front wheel support members 38 are mounted to a front structural member 210 and rear wheel support member 42 is mounted to a rear structural member 212. Front structural support member 210 and rear structural support member 212 are illustrated as being separate from each other, and adapted for engagement in a conventional manner with transverse load-supporting bars 214 mounted to the vehicle load bars, shown at 216. While front and rear structural members 210, 212, respectively, are shown as being separate from each other, it is contemplated that the structural members may also be a continuous piece as illustrated in connection with the version of FIG. 1.

With the configuration of carrier 20' as shown in FIG. 14, the user is able to initially place bicycle 24 in engagement with front wheel support members 38 and rear wheel support member 42, which provide a self-supporting feature as described previously. This enables the user to remove both hands from bicycle 24 while moving clamp arm mechanism 40 to its raised position and into engagement with front wheel 26 as described previously. The self-supporting feature of carrier 20' is especially advantageous in a roof rack application, which requires the user to lift bicycle 24 above the vehicle roof, by eliminating concerns involved in initially supporting bicycle 24 prior to stabilization using clamp arm mechanism 40.

In other versions, it is contemplated that carrier 20 may be adapted for use in connection with a mass transit vehicle such as a bus, providing sufficiently quick and easy mounting and removal of the bicycle to and from the carrier required at the vehicle stops.

While the invention has been shown and described with respect to certain details in its components and construction, it is understood that variations are possible and contemplated as being within the scope of the present invention. For example, and without limitation, various types of mechanisms may be utilized to provide vertical positioning of the clamping mechanism and for releasably engaging the arm of the clamping mechanism with the bicycle wheel. For example, to ensure vertical positioning of the clamp arm mechanism, the hub may be provided with a vertical passage or with aligned vertical openings in its side walls, and the clamp arm may be movable within the vertical passage or vertical openings only when the clamp arm is positioned vertically, to enable the clamp arm to be moved downwardly into engagement with the wheel. The hub may also be provided with a horizontal passage or aligned horizontal openings so as to enable the clamp arm to be moved inwardly to a stowed position when not in use. Further, while the specific illustrated embodiment of the latching lever arrangement has been described for maintaining the clamp arm in engagement with the wheel, any other satisfactory type of releasable latching arrangement may be employed for engaging the teeth on the clamp arm to selectively maintain the clamp arm in engagement with the wheel. A torsion spring may be employed in place of the flat over-center spring illustrated, to bias the latching lever into engagement with the teeth. Further, it is contemplated that engagement systems other than those employing teeth on the clamp arm may be utilized to maintain the clamp arm in engagement with the wheel, e.g. a friction-type system.

In addition, it is contemplated that the engagement areas of the pivotable front wheel engagement members may have a configuration other than the specific configuration illustrated, while still functioning to grip the bicycle wheel to provide a self-centering and initial bicycle supporting feature to enable the user to employ both hands to manipulate the clamp arm into engagement with the bicycle wheel. While the pivoting action of the front wheel support members provides highly satisfactory operation in engaging the wheels and providing a firm grip on the wheel to initially support the bicycle, it is also understood that stationary front wheel engagement members may be employed in place of the pivoting front wheel engagement members as illustrated. In this version, the front wheel engagement members are angled toward each other and define spaced apart areas which engage the lower extent of the wheel in order to center the wheel and accommodate various wheel sizes.

The self-centering front wheel support feature allows the clamp arm mechanism to be positioned so as to apply a vertical downward force on the wheel when moved into engagement with the wheel, at a location spaced midway between engagement of the front wheel with the front wheel support members. This provides a positive self-locking three-point engagement with the front wheel of the bicycle, to provide very stable mounting of the bicycle to the carrier. Further, this prevents the possibility present in certain prior art carriers wherein the clamp arm can be engaged in varying positions with the front wheel which could tend to move the front wheel out of engagement with the front wheel support structure.

Further, while clamp arm mechanism 40 is shown and described in connection with engagement with wheel 26, it is understood that clamp arm mechanism 40 may be employed to engage any other part of bicycle 24 above the engagement of the bicycle wheels with the wheel supports, e.g. the bicycle frame.

Various alternatives and embodiments are contemplated as being within the scope of the following claims particularly pointing out and distinctly claiming the subject matter regarded as the invention.

I claim:

1. A vehicle-mounted bicycle carrier for carrying a bicycle having first and second wheels, comprising:

a frame arrangement;

a first wheel support section interconnected with the frame arrangement for supporting the first bicycle wheel;

a second wheel support section interconnected with the frame arrangement for supporting the second bicycle wheel, wherein the second wheel support section includes a pair of spaced apart pivoting wheel engagement members, each of which has a wheel engagement area, wherein positioning of the second bicycle wheel between the wheel engagement members causes the second bicycle wheel to engage the wheel engagement areas and wherein the wheel engagement members pivot to grip the second bicycle wheel therebetween; and a stabilizing member engageable with the second bicycle wheel at a location above the first and second wheel support sections to stabilize the bicycle when the first and second bicycle wheels are engaged with the first and second wheel support sections, respectively, wherein the stabilizing member includes a variable length arm arrangement defining a lower end engaged with the frame arrangement and an upper end having a wheel engagement area configured to engage the second bicycle wheel at a location above the wheel engagement members.

2. The vehicle-mounted bicycle carrier of claim 1, wherein the frame arrangement includes a first structural member, and wherein the first wheel support section includes a stationary first wheel support member mounted to the first structural member, and a movable first wheel retainer for selectively maintaining the first wheel in engagement with the first wheel support member.

3. The vehicle-mounted bicycle carrier of claim 2, wherein the frame arrangement includes a second structural member to which the pair of spaced apart pivoting wheel engagement members are mounted, and wherein the stabilizing member is mounted to the second structural member.

4. The vehicle-mounted bicycle carrier of claim 3, wherein the first and second structural members are formed integrally with each other.

5. The vehicle-mounted bicycle carrier of claim 1, wherein the wheel engagement area of each pivoting wheel engagement member has a generally arcuate configuration for engaging the second bicycle wheel on opposite sides of the center of the second bicycle wheel.

6. A vehicle-mounted bicycle carrier for carrying a bicycle having first and second wheels, comprising:
  a first wheel support section for supporting the first bicycle wheel, wherein the first wheel support section comprises a first structural member, a stationary first wheel support member mounted to the first structural member, and a movable first wheel retainer for selectively maintaining the first wheel in engagement with the first wheel support member;
  a second wheel support section for supporting the second bicycle wheel, wherein the second wheel support section includes a pair of spaced apart pivoting wheel engagement members, each of which has a wheel engagement area, wherein positioning of the second bicycle wheel between the wheel engagement members causes the second bicycle wheel to engage the wheel engagement areas and wherein the wheel engagement members pivot to grip the second bicycle wheel therebetween; and
  a stabilizing member engageable with the bicycle at a location above the first and second wheel support sections to stabilize the bicycle when the first and second bicycle wheels are engaged with the first and second wheel support sections, respectively;
  wherein the second wheel support section comprises a second structural member to which the pair of spaced apart pivoting wheel engagement members are mounted, and wherein the stabilizing member is mounted to the second structural member, wherein the stabilizing member comprises a variable length arm arrangement defining a lower end engaged with the second structural member and an upper end having a wheel engagement area.

7. A vehicle-mounted bicycle carrier for carrying a bicycle having first and second wheels, comprising:
  a first wheel support section for supporting the first bicycle wheel;
  a second wheel support section for supporting the second bicycle wheel, wherein the second wheel support section includes a pair of spaced apart pivoting wheel engagement members, each of which has a wheel engagement area, wherein positioning of the second bicycle wheel between the wheel engagement members causes the second bicycle wheel to engage the wheel engagement areas and wherein the wheel engagement members pivot to grip the second bicycle wheel therebetween, wherein the wheel engagement area of each pivoting wheel engagement member has a generally arcuate configuration for engaging the second bicycle wheel on opposite sides of the center of the second bicycle wheel; and
  a stabilizing member engageable with the bicycle at a location above the first and second wheel support sections to stabilize the bicycle when the first and second bicycle wheels are engaged with the first and second wheel support sections, respectively, wherein the stabilizing member extends upwardly at a location between the pivoting wheel engagement members.

8. The vehicle-mounted bicycle carrier of claim 7, wherein engagement of the second bicycle wheel with and between the pair of pivoting wheel engagement members is operable to position a hub located at the center of the second bicycle wheel in a centered position between the pair of pivoting wheel engagement members, and wherein the stabilizing member includes a base section centered between the pair of pivoting wheel engagement members and an extendible wheel-engaging arm movably mounted to the base section, wherein the arm includes a wheel engagement area adapted to engage an upper area of the second bicycle wheel, wherein the base section includes a portion in alignment with the hub of the second bicycle wheel to prevent operation of a quick-release mechanism associated with the hub.

9. A vehicle-mounted bicycle carrier for carrying a bicycle having first and second wheels, comprising:
  a first wheel support section for supporting the first wheel;
  a second wheel support section for supporting the second wheel, wherein the second wheel support section includes a pair of movable wheel engagement members that engage the wheel on opposite sides of the center of the wheel; and
  a variable height clamping member for selectively maintaining the second bicycle wheel in engagement with the pair of movable wheel engagement members, wherein the variable height clamping member includes a wheel engagement area which engages the second bicycle wheel at a location between the pair of movable wheel engagement members.

10. The vehicle-mounted bicycle carrier of claim 9, wherein the second wheel support section includes a structural member to which the pair of movable wheel engagement members are mounted, and wherein the variable height clamping member comprises a base portion secured to the structural member and an arm which defines the upper engagement area, wherein the arm is movably mounted to the base portion.

11. The vehicle-mounted bicycle carrier of claim 10, wherein the base portion of the variable height clamping member is mounted to the structural member at a central location between the pair of movable wheel engagement members.

12. The vehicle-mounted bicycle carrier of claim 9, wherein each of the movable wheel engagement members defines a wheel engagement area, wherein the upper engagement area of the variable height clamping member and the wheel engagement areas of the pivoting wheel engagement members function to provide a three-point engagement with the second bicycle wheel to stabilize the bicycle on the bicycle carrier.

13. The vehicle-mounted bicycle carrier of claim 12, wherein the wheel engagement areas of the wheel engagement members are arcuate in shape and are configured to grip the second bicycle wheel when positioned therebetween.

14. A vehicle-mounted bicycle carrier for carrying a bicycle having first and second wheels, comprising:
   a first wheel support section including a first structural member and a first wheel support member mounted to the first structural member for supporting the first wheel of the bicycle;
   a second wheel support section including a second structural member and a pair of pivoting wheel engagement members pivotably mounted to the second structural member, wherein the second bicycle wheel is adapted for engagement with and between the pair of pivoting wheel engagement members;
   a first wheel engagement member movably mounted to the first structural member for movement between an engaged position for retaining the first bicycle wheel in engagement with the first wheel support member, and a release position for enabling disengagement of the first bicycle wheel from the first wheel support member, wherein the first wheel engagement member comprises a mounting section secured to the first structural member and a wheel engagement section pivotably interconnected with the mounting section for pivoting movement into and out of engagement with a rim portion defined by the first bicycle wheel; and
   a second wheel engagement member movably mounted to the second structural member for movement between an engaged position for retaining the second bicycle wheel in engagement with and between the pair of pivoting wheel engagement members, and a release position for enabling disengagement of the second bicycle wheel from between the pair of pivoting wheel engagement members.

15. A vehicle-mounted bicycle carrier for carrying a bicycle having first and second wheels, comprising:
   a first wheel support section including a first structural member and a first wheel support member mounted to the first structural member for supporting the first wheel of the bicycle;
   a second wheel support section including a second structural member and a pair of pivoting wheel engagement members pivotably mounted to the second structural member, wherein the second bicycle wheel is adapted for engagement with and between the pair of pivoting wheel engagement members;
   a first wheel engagement member movably mounted to the first structural member for movement between an engaged position for retaining the first bicycle wheel in engagement with the first wheel support member, and a release position for enabling disengagement of the first bicycle wheel from the first wheel support member; and
   a second wheel engagement member movably mounted to the second structural member for movement between an engaged position for retaining the second bicycle wheel in engagement with and between the pair of pivoting wheel engagement members, and a release position for enabling disengagement of the second bicycle wheel from between the pair of pivoting wheel engagement members, wherein the second wheel engagement member comprises a base portion secured to the second structural member between the pair of pivoting wheel engagement members, and an extendible and retractable wheel engagement arm interconnected with the base portion, wherein the arm includes a wheel engagement area movable into and out of engagement with the wheel upon retraction and extension of the arm relative to the base portion.

16. The vehicle-mounted bicycle carrier of claim 15, further comprising a selectively operable locking mechanism interposed between the base portion and the arm for selectively locking the position of the arm relative to the base portion for engaging the wheel engagement portion of the arm with the wheel, wherein the selective locking arrangement is releasable so as to enable extension of the arm relative to the base portion to disengage the wheel engaging portion of the arm from the wheel.

17. In a bicycle carrier for carrying a bicycle having first and second wheels, wherein the carrier includes a frame and a first stationary wheel support section for supporting the first bicycle wheel, the improvement comprising:
   a self-centering second wheel support section interconnected with the frame for supporting the second bicycle wheel, wherein the second wheel support section is operable to position the center of the second bicycle wheel in a predetermined location relative to the frame when the second bicycle wheel is engaged with the second wheel support section; and
   an extendible and retractable retainer member interconnected with the frame, wherein the extendible and retractable retainer member includes an upper wheel-engaging portion, and wherein the second extendible and retractable retainer member is constructed and arranged such that the upper wheel-engaging portion is adapted to engage the wheel at a location substantially vertically above the center of the wheel.

18. The improvement of claim 17, wherein the self-centering second wheel support section comprises a pair of wheel engagement members pivotably interconnected with the frame.

19. The improvement of claim 18, wherein each wheel engagement member includes an arcuate wheel engagement area, wherein the wheel engagement areas engage the second bicycle wheel in spaced locations and are configured so as to position the second bicycle wheel such that the center of the second bicycle wheel is centrally located between the pair of wheel engagement members.

20. The improvement of claim 19, wherein the wheel engagement areas of the wheel engagement members are configured to grip the sides of the wheel so as to support the bicycle on the frame.

21. The improvement of claim 18, wherein the extendible and retractable retainer member comprises a base portion secured to the frame between the pair of wheel engagement members, and an arm which includes the upper wheel-engaging portion, wherein the arm is extendible and retractable relative to the base portion for moving the wheel-engaging portion of the arm into and out of engagement with the second bicycle wheel at a location vertically above the center of the wheel.

22. The improvement of claim 21, further comprising a releasable latch arrangement interposed between the base portion and the arm for selectively locking the arm in position relative to the base portion for maintaining the wheel-engaging portion of the arm in engagement with the wheel.

23. The improvement of claim 22, wherein the releasable latching arrangement comprises a series of teeth formed on the arm, and a biased latching member movably mounted to the base portion for selective engagement with the teeth.

24. A method of securing a bicycle having first and second wheels to a vehicle, comprising the steps of:

mounting a carrier to the vehicle, wherein the carrier includes a first wheel support section and a second wheel support section having a pair of movable wheel engagement members;

positioning the bicycle on the carrier such that the first bicycle wheel is engaged with and supported by the first wheel support section and the second bicycle wheel is engaged with and supported between the movable wheel engagement members, wherein engagement of the first and second bicycle wheels with the first wheel support section and with the movable wheel engagement members, respectively, functions to support the bicycle on the carrier; and engaging a stabilizing member with the bicycle at a location above the first and second wheel support sections.

25. The method of claim 24, wherein the step of engaging the stabilizing member with the bicycle is carried out by engaging the stabilizing member with one of the bicycle wheels.

26. The method of claim 25, wherein the step of engaging the stabilizing member with one of the bicycle wheels is carried out by engaging the stabilizing member with the second bicycle wheel at a location above and between the pair of movable wheel engagement members.

27. The method of claim 26, wherein the step of engaging the stabilizing member with the second bicycle wheel is carried out by operation of a variable length engagement member having a wheel-engaging portion movable into and out of engagement with the wheel.

28. The method of claim 27, further comprising the step of releasably locking the wheel-engaging portion in engagement with the wheel so as to maintain the second bicycle wheel in engagement with the movable wheel engagement members.

29. The method of claim 26, wherein the movable wheel engagement members are pivotably mounted to a structural member associated with the bicycle carrier, wherein each movable wheel engagement member is pivotably mounted to the structural member, wherein the step of engaging the second bicycle wheel with and between the movable engagement members is carried out such that a lower area of the wheel engages the movable wheel engagement members at spaced locations so as to pivot the wheel engagement members toward each other and to capture the wheel therebetween.

30. The method of claim 29, wherein the step of engaging the stabilizing member with the bicycle is carried out by engaging the stabilizing member with the second bicycle wheel at a location above and between the pivoting wheel engagement members by application of a downward force on the wheel so as to prevent disengagement of the wheel from the pivoting wheel engagement members.

* * * * *

UNITED STATES PATENT AND TRADEMARK OFFICE
CERTIFICATE OF CORRECTION

PATENT NO. : 6,761,297 B1
DATED : July 13, 2004
INVENTOR(S) : Fabio Pedrini

It is certified that error appears in the above-identified patent and that said Letters Patent is hereby corrected as shown below:

Title page,
Item [*] Notice, correct the adjusted days from "0" to -- 64 --.

Column 16,
Line 35, after "the" delete "second".

Signed and Sealed this

Fifth Day of October, 2004

JON W. DUDAS
*Director of the United States Patent and Trademark Office*